United States Patent
Han

(10) Patent No.: US 11,225,909 B2
(45) Date of Patent: Jan. 18, 2022

(54) COMBUSTOR AND GAS TURBINE HAVING THE SAME

(71) Applicant: DOOSAN HEAVY INDUSTRIES & CONSTRUCTION CO., LTD., Changwon-si (KR)

(72) Inventor: Dongsik Han, Changwon-si (KR)

(*) Notice: Subject to any disclaimer, the term of this patent is extended or adjusted under 35 U.S.C. 154(b) by 16 days.

(21) Appl. No.: 16/803,990

(22) Filed: Feb. 27, 2020

(65) Prior Publication Data

US 2020/0318550 A1 Oct. 8, 2020

(30) Foreign Application Priority Data

Apr. 8, 2019 (KR) .................. 10-2019-0040782

(51) Int. Cl.
*F02C 7/00* (2006.01)
*F02C 7/232* (2006.01)
*F23R 3/28* (2006.01)

(52) U.S. Cl.
CPC ............ *F02C 7/232* (2013.01); *F23R 3/28* (2013.01)

(58) Field of Classification Search
CPC ...... F23R 3/18; F23R 3/20; F23R 3/28; F23R 3/283; F23R 3/286; F23R 3/002; F23R 3/14; F23R 3/46; F23D 2900/14021; F05D 2240/127

See application file for complete search history.

(56) References Cited

U.S. PATENT DOCUMENTS

| | | | | |
|---|---|---|---|---|
| 5,114,099 A | * | 5/1992 | Gao | B64C 21/10 244/130 |
| 5,658,358 A | * | 8/1997 | Chyou | B01F 5/0473 138/37 |
| 2002/0014078 A1 | * | 2/2002 | Mandai | F23R 3/286 60/737 |
| 2004/0020210 A1 | * | 2/2004 | Tanaka | F23R 3/343 60/740 |
| 2008/0083229 A1 | * | 4/2008 | Haynes | F23R 3/286 60/776 |
| 2010/0242482 A1 | * | 9/2010 | Kraemer | F02C 7/228 60/746 |
| 2013/0086910 A1 | * | 4/2013 | Khan | F23R 3/36 60/737 |
| 2013/0133329 A1 | | 5/2013 | Wang et al. | |
| 2014/0311150 A1 | | 10/2014 | Pinson et al. | |
| 2018/0363588 A1 | * | 12/2018 | Iglewski | F02C 6/18 |
| 2019/0093570 A1 | * | 3/2019 | Miyamoto | F02C 7/232 |

FOREIGN PATENT DOCUMENTS

KR 101885413 B1 8/2018

* cited by examiner

*Primary Examiner* — Edwin Kang
(74) *Attorney, Agent, or Firm* — Harvest IP Law, LLP

(57) ABSTRACT

A combustor and a gas turbine having the same which can improve a degree of mixing of fuel and air and achieve a reduction in combustion vibration are provided. The combustor may include a fuel nozzle disposed on a nozzle tube, a center body disposed at a center of the fuel nozzle and connected to a fuel nozzle base, a plurality of swirlers circumferentially spaced apart from each other between the center body and the fuel nozzle, and a plurality of fuel pegs spaced apart from each other around the center body to inject fuel into air flowing in the fuel nozzle, wherein the plurality of fuel pegs are disposed behind the swirlers on the center body based on a combustion chamber of the combustor.

17 Claims, 8 Drawing Sheets

COMBUSTOR AND GAS TURBINE HAVING THE SAME

CROSS-REFERENCE TO RELATED APPLICATION

This application claims priority to Korean Patent Application No. 10-2019-0040782, filed on Apr. 8, 2019, the entire disclosure of which is incorporated herein by reference in its entirety.

BACKGROUND

Field

Apparatuses and methods consistent with exemplary embodiments relate to a combustor and a gas turbine having the same, and more particularly, to a combustor that improves a degree of mixing of fuel and air and achieves a reduction in combustion vibration by arranging fuel pegs for injection of fuel in front of swirlers based on a direction of air flow, and a gas turbine having the same.

Description of the Related Art

A gas turbine is a power generation apparatus that converts the thermal energy of a fluid, such as gas or steam, into a rotational force as mechanical energy, and includes a rotor having a plurality of buckets arranged to axially rotate the rotor by the force of the fluid flowing through the buckets, and a casing installed to surround the rotor and having a plurality of diaphragms.

In general, a gas turbine includes a compressor, a combustor, and a turbine. The compressor draws an outside air thereinto, compresses the air, and then transmits the compressed air to the combustor in which the compressed air is mixed with fuel for combustion. The high-temperature and high-pressure gas produced in the combustor is used to drive a generator by rotating the rotor of the turbine while passing through the turbine.

The combustor of the gas turbine injects fuel into the air compressed by the compressor to mix them for combustion in a combustion chamber. When the mixture of air and fuel is supplied to the combustion chamber, it is important to increase a degree of mixing of air and fuel. Improving the degree of mixing of air and fuel reduces combustion vibration during combustion in the combustion chamber, resulting in an enhancement in overall power generation efficiency of the gas turbine.

In the related art, as shown in FIG. 1, a nozzle tube 93 and a center body 92 define a passage through which a mixture of air and fuel is supplied to a combustion chamber 96. Swirlers 94 are arranged between the nozzle tube 93 and the center body 92 and fuel injection pegs 95 are arranged behind the swirlers 94. Alternatively, fuel injection holes may be formed on the swirlers 94.

In the related art, air is first rotated by the swirlers 94 to form turbulence, fuel is then injected from the fuel injection pegs 95 toward the combustion chamber 96 so that the air is mixed with the fuel in relative proximity of the combustion chamber 96, which leads to a low degree of mixing of air and fuel. The low degree of mixing of air and fuel causes an increase in combustion vibration during combustion in the combustion chamber 96.

SUMMARY

Aspects of one or more exemplary embodiments provide a combustor that improves a degree of mixing of fuel and air and achieves a reduction in combustion vibration by arranging fuel pegs for injection of fuel in front of swirlers based on a direction of air flow, and a gas turbine having the same.

Additional aspects will be set forth in part in the description which follows and, in part, will become apparent from the description, or may be learned by practice of the exemplary embodiments.

According to an aspect of an exemplary embodiment, there is provided a combustor including: a plurality of fuel nozzles disposed on a nozzle tube; a center body disposed at a center of each of the fuel nozzles and connected to a fuel nozzle base; a plurality of swirlers circumferentially spaced apart from each other between the center body and the fuel nozzle; and a plurality of fuel pegs spaced apart from each other around the center body to inject fuel into air flowing in the fuel nozzle, wherein the plurality of fuel pegs are disposed behind the swirlers on the center body based on a combustion chamber of the combustor.

Individual reference lines extending from the fuel pegs toward the fuel nozzle base may be offset from an extension reference line extending from an end of each of the swirlers toward the fuel nozzle base.

The fuel pegs may be arranged in a plurality of stages between the swirlers and the fuel nozzle base on the center body.

If the fuel pegs are arranged in the plurality of stages, a first stage peg which is a fuel peg disposed closest to each of the swirlers may include a first injection hole formed at an angle corresponding to an angle of arrangement (a1) of the swirler, and a first stage peg reference line which is a reference line extending from an end of the first stage peg toward the fuel nozzle base may be offset from the extension reference line of the swirler on the center body.

A second stage peg reference line which is a reference line extending from an end of a second stage peg which is a fuel peg disposed behind the first stage peg based on the combustion chamber toward the fuel nozzle base may be offset from the extension reference line of the swirler and the first stage peg reference line on the center body.

The second stage peg may include a second front injection hole formed in a direction of air flow and a plurality of second rear injection holes disposed behind the second front injection hole, each of the second rear injection holes being formed at a predetermined angle of injection with the direction of air flow.

A third stage peg reference line which is a reference line extending from an end of a third stage peg which is a fuel peg disposed behind the second stage peg based on the combustion chamber toward the fuel nozzle base may be offset from the extension reference line of the swirler and the first and second stage peg reference lines on the center body.

The third stage peg may include a third front injection hole formed in the direction of air flow and a plurality of third rear injection holes disposed behind the third front injection hole, each of the third rear injection holes being formed at a predetermined angle of injection with the direction of air flow and having an angle of injection greater than the second rear injection hole.

Each of the fuel pegs may have an elliptical shape such that air flows smoothly thereon.

The fuel peg may include a first curved part curved toward the fuel nozzle base and a second curved part curved toward the combustion chamber, and the first curved part may have a relatively gentler curvature than the second curved part.

The fuel peg may include a front injection hole formed at a predetermined angle of injection with a direction of air flow, the front injection hole being disposed on the second curved part.

The fuel peg may include a rear injection hole formed perpendicular to the direction of air flow, the rear injection hole being disposed on the first curved part.

A barrier block may be disposed, in a form of protruding toward the fuel nozzle base, at a circumference of the front or rear injection hole.

Each of the fuel pegs may have a diamond shape such that air flows smoothly thereon.

The fuel peg may include a first inclined part inclined toward the fuel nozzle base and a second inclined part inclined toward the combustion chamber, and the first inclined part may have a relatively gentler inclination than the second inclined part.

The fuel peg may include a front injection hole formed at a predetermined angle of injection with a direction of air flow, the front injection hole being disposed on the second inclined part.

The fuel peg may further include a rear injection hole formed perpendicular to the direction of air flow, the rear injection hole being disposed on the first inclined part.

A barrier block may be disposed, in a form of protruding toward the fuel nozzle base, at a circumference of the front or rear injection hole.

A cyclone helix may be formed in the front or rear injection hole so that fuel is injected while forming turbulence to increase a degree of mixing of fuel and air, and the cyclone helix may include a spiral groove formed spirally in the front or rear injection hole and a tapered part tapered from inside to outside in the front or rear injection hole.

According to an aspect of another exemplary embodiment, there is provided a gas turbine including: a casing; a compressor section disposed in the casing and configured to compress air; a combustor connected to the compressor section in the casing and configured to combust a mixture of fuel with the compressed air a turbine section connected to the combustor in the casing and configured to generate power using combustion gas generated by the combustor, and a diffuser connected to the turbine section in the casing and configured to discharge the gas to an outside.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
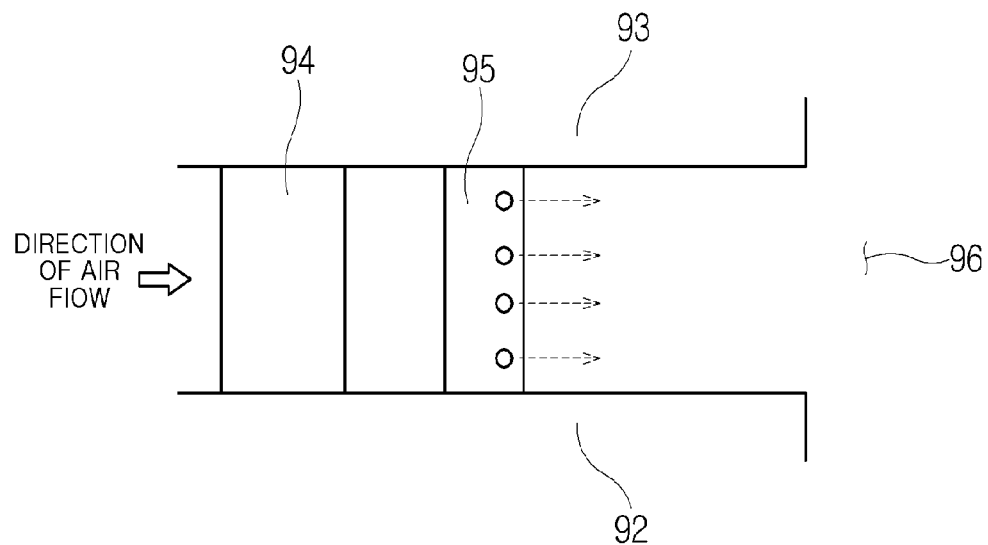
FIG. 1 is a view illustrating an arrangement of related art fuel injection pegs.

Various modifications may be made to the embodiments of the disclosure, and there may be various types of embodiments. Thus, specific embodiments will be illustrated in the accompanying drawings and the embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

The terminology used herein is for the purpose of describing particular embodiments only and is not intended to limit the scope of the disclosure. As used herein, the singular forms "a", "an", and "the" are intended to include the plural forms as well, unless the context clearly indicates otherwise. In this specification, terms such as "comprise", "include", or "have/has" should be construed as designating that there are such features, integers, steps, operations, elements, components, and/or a combination thereof in the specification, not to exclude the presence or possibility of adding one or more of other features, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, a combustor and a gas turbine having the same according to exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

Figure 2:
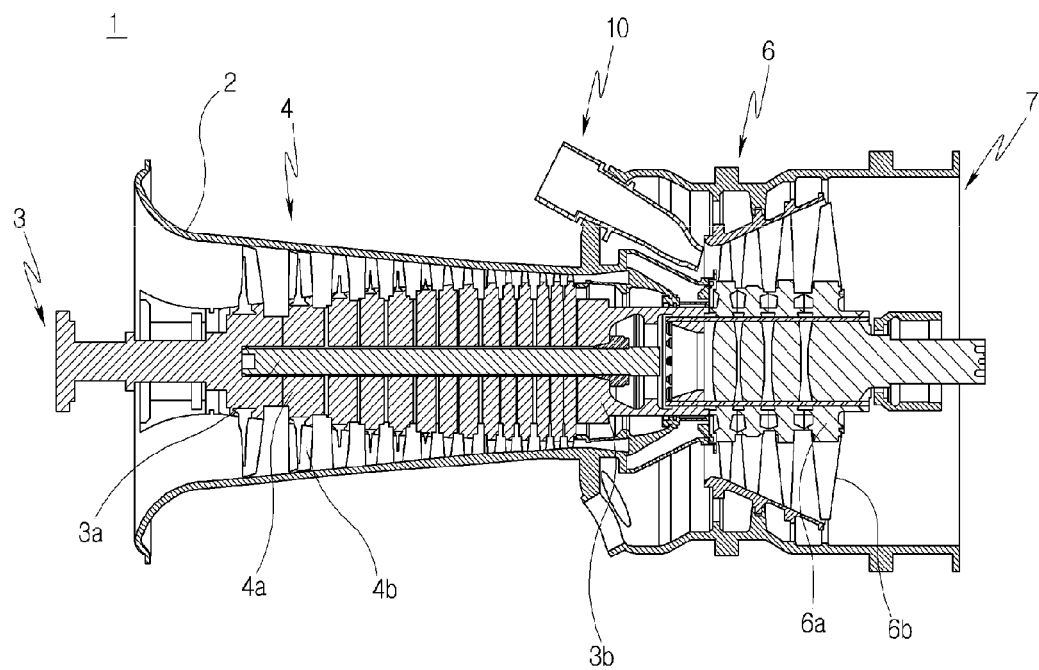
FIG. 2 is a side cross-sectional view illustrating an overall structure of a gas turbine according to an exemplary embodiment.

FIG. 2 is a side cross-sectional view illustrating an overall structure of a gas turbine 1 according to an exemplary embodiment. Referring to FIG. 2, the gas turbine may include a casing 2, a compressor section 4 configured to compress air, a combustor 10 configured to combust a mixture of fuel with the compressed air, a turbine section 6 configured to generate power using combustion gas, a diffuser 7 configured to discharge exhaust gas, and a rotor 3 configured to connect the compressor section 4 and the turbine section 6 to transmit rotational power.

Thermodynamically, outside air is introduced into the compressor section disposed upstream of the gas turbine for an adiabatic compression process. The compressed air is supplied to the combustor to be mixed with fuel therein for an isobaric combustion process. The combustion gas is supplied to the turbine section disposed downstream of the gas turbine for an adiabatic expansion process.

Based on the direction of an air flow, the compressor section 4 is disposed in front of the casing 2 and the turbine section 6 is disposed in a rear of the casing 2.

A torque tube 3b serving as a torque transfer member for transferring the torque generated in the turbine section 6 to the compressor section 4 is disposed between the compressor section 4 and the turbine section 6.

The compressor section 4 includes a plurality of compressor rotor disks 4a, each of which is fastened by a tie rod 3a to prevent axial separation in an axial direction of the tie rod 3a.

The compressor rotor disks 4a are arranged in the axial direction in a state in which the tie rod 3a extends through the central holes of the compressor rotor disks 4a. In the vicinity of the outer peripheral portion of each of the compressor rotor disks 4a, a flange (not illustrated) protrudes axially and is coupled to an adjacent rotor disk so as not to be rotatable relative thereto.

Each of the compressor rotor disks 4a may include a plurality of blades 4b (or referred to as buckets) radially coupled to the outer peripheral surface thereof. Each of the blades 4b has a dovetail (not illustrated) and is fastened to the compressor rotor disk 4a therethrough.

Examples of fastening through the dovetail may include a tangential type and an axial type, which may be selected according to the structure required for the gas turbine used. In some cases, the compressor blades 4b may be fastened to the compressor rotor disk 4a by using other types of fasteners, such as, a key or a bolt.

A plurality of compressor vanes (or referred to as diaphragms) fixed to the inner circumferential surface of the casing 2 are positioned between each of the compressor rotor disks 4a. While the compressor rotor disks 4a rotate along with a rotation of the tie rod 3a, the compressor vanes fixed to the casing 2 do not rotate.

The tie rod 3a is installed to extend through the center of the compressor rotor disks 4a. One end of the tie rod 3a is fixed to the most upstream compressor rotor disk 4a, and the other end thereof is fixed in the torque tube 3b.

It is understood that the type of the tie rod 3a may not be limited to the example illustrated in FIG. 2, and may be changed or vary according to one or more other exemplary embodiments.

For example, there are three types of tie rods: a single-type in which a single tie rod extends through the center of the compressor rotor disks; a multi-type in which multiple tie rods are arranged in a circumferential direction; and a complex type in which the single-type and the multi-type are combined.

In order to increase the pressure of a fluid in the compressor section of the gas turbine and then adjust the angle of flow of the fluid, entering into an inlet of the combustor, to a design angle of flow, a swirler serving as a guide vane may be installed next to the diffuser 7.

The combustor 10 mixes the introduced compressed air with fuel and combusts the mixture to produce high-temperature and high-pressure combustion gas with high energy. The temperature of the combustion gas is increased to a heat-resistant limit of the components of the combustor 10 and turbine section 6 through an isobaric combustion process.

The combustion system of the gas turbine may include a plurality of combustors 10 arranged in a form of a cell in the casing 2.

In the turbine section 6, the high-temperature and high-pressure combustion gas discharged from the combustor 10 applies impingement or reaction force to the blades of the turbine section 6 while expanding, resulting in mechanical energy.

Some of the mechanical energy obtained in the turbine section 6 is provided as energy required for compression of air in the compressor section 4, and the remainder is used to produce electric power for driving a generator.

The turbine section 6 may include a plurality of stators and rotors alternately arranged therein, and the rotors are driven by combustion gas to rotate the output shaft connected to the generator.

To this end, the turbine section 6 includes a plurality of turbine rotor disks 6a. Each of the turbine rotor disks 6a has a structure similar to the compressor rotor disk 4a.

Each of the turbine rotor disks 6a also has a flange provided for coupling with an adjacent turbine rotor disk 6a, and includes a plurality of turbine blades 6b (or referred to as buckets) arranged radially. The turbine blades 6b may also be coupled to the turbine rotor disk 6a in a dovetail manner.

In the casing 2, vanes (or referred to as diaphragms) rotating relative to the turbine blades 6b may be mounted on the inner peripheral surface of the turbine section 6.

In the gas turbine having the above-described structure, after the air introduced into the compressor section 4 is compressed therein and combusted in the combustor 10, the combustion gas flows to the turbine section 6 to drive the generator and is discharged to the atmosphere through the diffuser 7.

Here, the rotating component such as the tie rod 3a, the torque tube 3b, the compressor rotor disk 4a, the compressor blade 4b, the turbine rotor disk 6a, and the turbine blade 6b may be collectively referred to as a rotor or a rotating unit. The non-rotating component such as the casing 2, the vane, and the diaphragm may be collectively referred to as a stator or a fixed unit.

Figure 3:
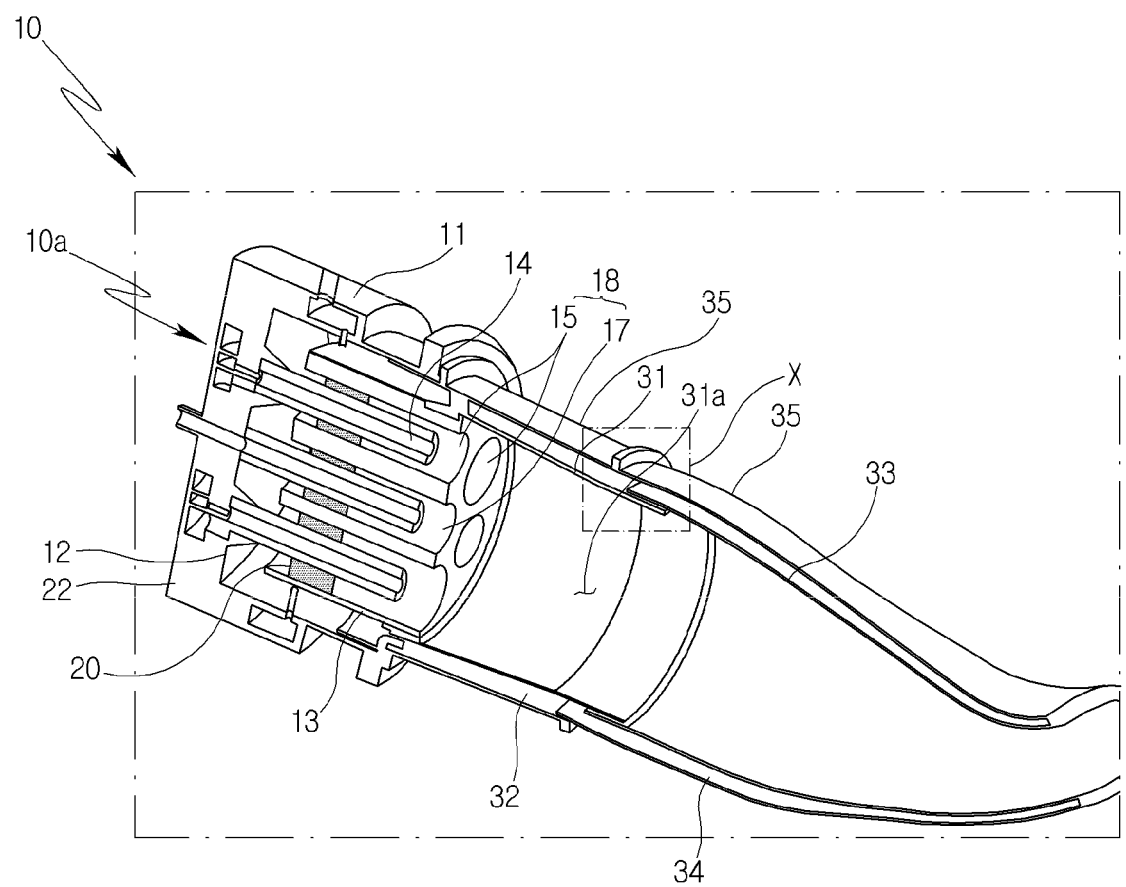
FIG. 3 a cross-sectional perspective view illustrating an overall structure of a combustor according to an exemplary embodiment.

FIG. 3 illustrates the structure of the combustor 10 applied to the gas turbine 1. The combustor 10 may include a burner casing 11 configured to surround a plurality of fuel nozzles 18 (e.g., fuel nozzles 15 and 17) of a burner 10a, a liner 31 configured to define a combustion chamber 31a, a transition piece 33 serving as a connector between the combustor 10 and the turbine section 6, and a flow sleeve 35 configured to annularly surround the liner 31 and the transition piece 33.

Referring to FIG. 3, the liner 31 provides the combustion chamber 31a in which the fuel injected by the fuel nozzles 15 and 17 is mixed with the compressed air supplied from the compressor section for combustion. The liner 31 may be cooled by the compressed air flowing through a compressed air passage 32 that is an annular space defined by the flow sleeve 35 on the outer periphery of the liner 31. The fuel nozzles 15 and 17 are coupled to the front end of the liner 31.

The transition piece 33 is connected to the rear end of the liner 31 to transfer the combustion gas, burned by an ignition plug, to the turbine section. The liner 31 and the transition piece 33 are cooled by the compressed air supplied to annular spaces, that is compressed air passages 32 and 34, defined by the flow sleeve 35 surrounding the liner 31 and the transition piece 33 to prevent the liner 31 and the transition piece 33 from being damaged due to the high temperature of the combustion gas.

The fuel nozzles 18 are annularly surrounded by the burner casing 11, which functions as a housing, and are connected to the liner 31. A cylindrical member having a plurality of openings may be inserted into the connection between the fuel nozzles 18 and the liner 31. The cylindrical member may be a nozzle tube 13 including the fuel nozzles 18. The openings formed in the nozzle tube 13 function as the fuel nozzles 18 which may include a central nozzle 17 and a plurality of peripheral nozzles 15 surrounding the central nozzle 17.

Each of the fuel nozzles 18 surrounds a center body 14 extending in a forward direction and a backward direction of the combustor in a center of the cylindrical fuel nozzle 18. The center body 14 may be connected, at one end thereof, to a fuel nozzle base 12 to be supplied with fuel therefrom, and the fuel may be injected through fuel injection openings formed on swirlers 20 and/or around the center body 14 to be mixed with compressed air. It is understood that the positions and shapes of the fuel nozzles to which fuel is supplied may not be limited to the example illustrated in FIG. 3, and may be changed or vary according to one or more other exemplary embodiments.

For example, the fuel nozzle base 12 may be connected to an end cover 22 which may include components to be at least partially supplied with fuel.

Figure 4:
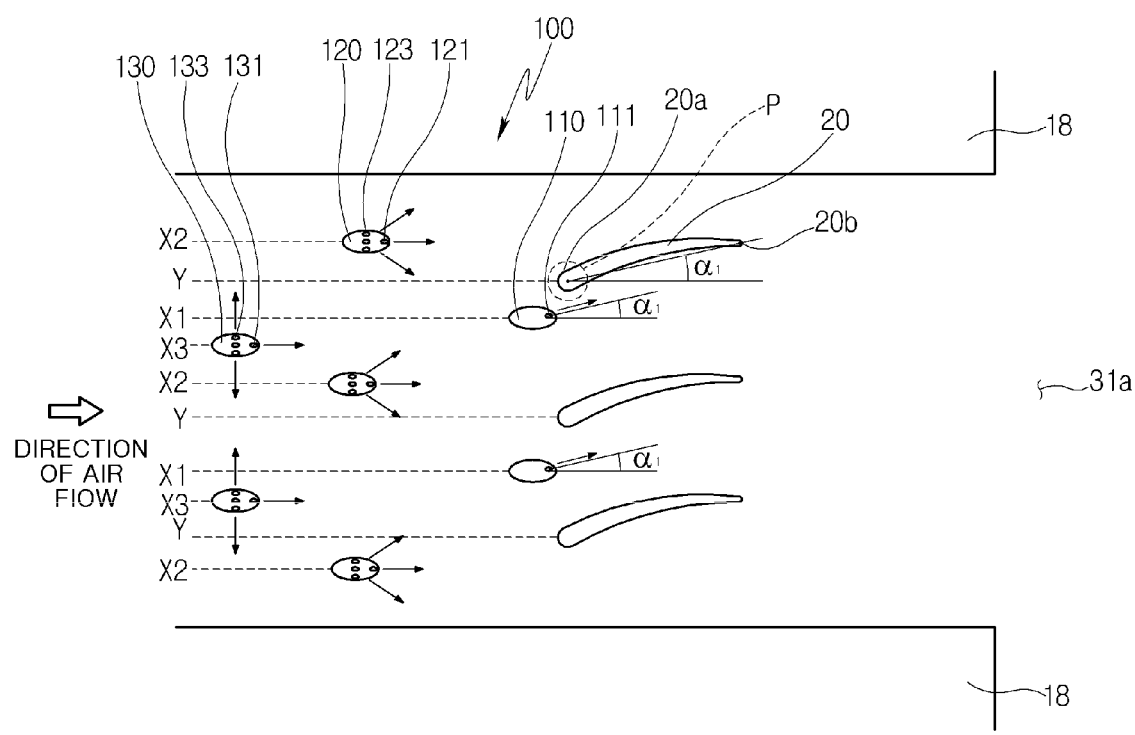
FIG. 4 is a view illustrating an arrangement of swirlers and fuel pegs in the combustor according to an exemplary embodiment.
Figure 5:
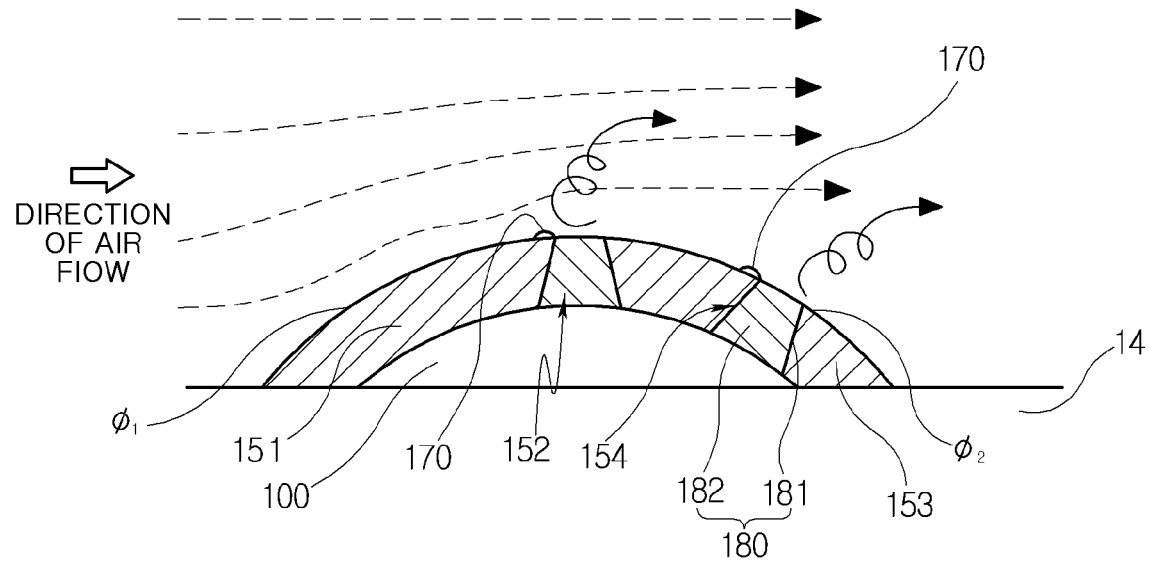
FIG. 5 is a cross-sectional view illustrating one form of fuel peg when viewed from a side according to the exemplary embodiment.
Figure 6:
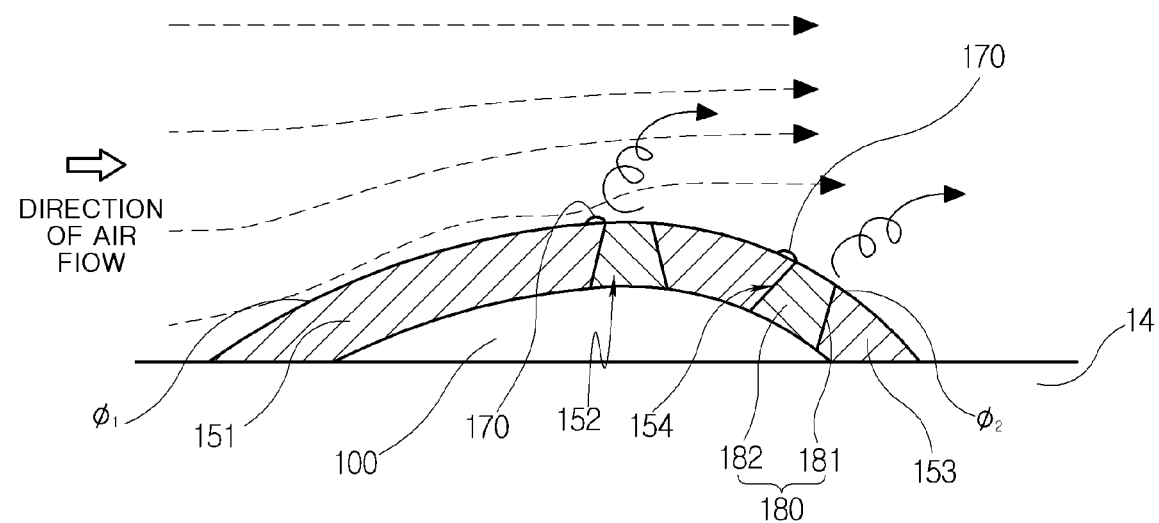
FIG. 6 is a cross-sectional view illustrating another form of fuel peg when viewed from the side according to the exemplary embodiment.
Figure 7:
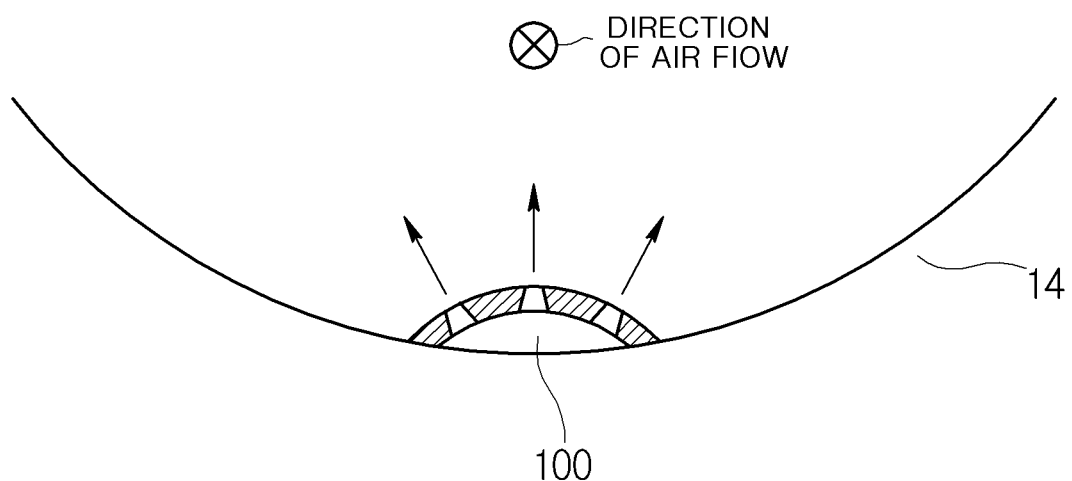
FIG. 7 is a cross-sectional view illustrating one fuel peg when viewed from a rear according to the exemplary embodiment.
Figure 8:
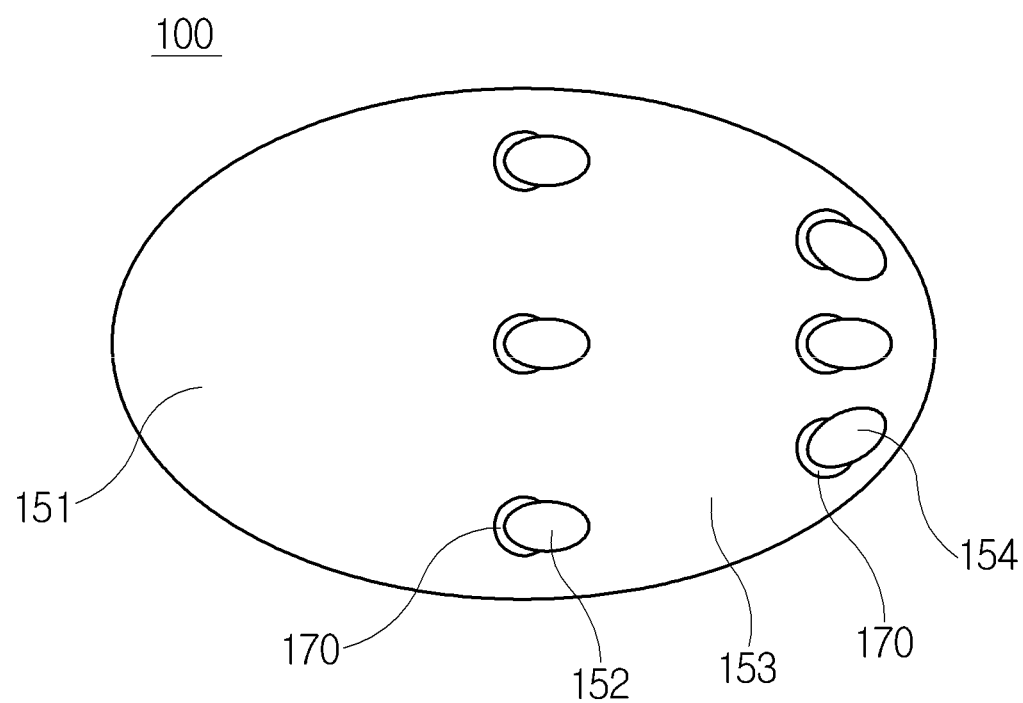
FIG. 8 is a view illustrating one fuel peg when viewed from a top according to the exemplary embodiment.

FIG. 4 is a view illustrating an arrangement of swirlers 20 and fuel pegs 100 in the combustor according to an exemplary embodiment. FIG. 5 is a cross-sectional view illustrating one form of fuel peg 100 when viewed from a side according to the exemplary embodiment. FIG. 6 is a cross-sectional view illustrating another form of fuel peg 100 when viewed from the side according to the exemplary embodiment. FIG. 7 is a cross-sectional view illustrating one fuel peg 100 when viewed from a rear according to the exemplary embodiment. FIG. 8 is a view illustrating one fuel peg 100 when viewed from a top according to the exemplary embodiment.

Referring to FIGS. 4 to 8, the combustor may include a plurality of fuel nozzles 18, a plurality of center bodies 14, a plurality of swirlers 20, and a plurality of fuel pegs 100.

As illustrated in FIG. 3, the fuel nozzles 18 may be disposed on the nozzle tube 13, and the center bodies 14 may be disposed at the centers of the respective fuel nozzles 18 and may be connected to the fuel nozzle base 12.

The swirlers 20 may be circumferentially spaced apart from each other between each of the center bodies 14 and an associated one of the fuel nozzles 18.

The fuel pegs 100 may be spaced apart from each other around each of the center bodies 14 to mix air and fuel by injecting the fuel into the air flowing in the associated fuel nozzle 18.

Based on the combustion chamber 31a, the fuel pegs 100 may be disposed behind the swirlers 20 on the center body 14. That is, in the related art, fuel is injected into the air having passed through the swirlers 20 and introduced into the combustion chamber 31a. However, in the exemplary embodiments, fuel may be injected into air and then pass through the swirlers 20 to enter the combustion chamber 31a.

For example, in the exemplary embodiments, the fuel pegs 100 may be disposed behind the swirlers 20 to increase the time required to mix air and fuel, thereby increasing a degree of mixing of air and fuel. Thus, it can be expected that combustion vibration is reduced, when a mixture of air and fuel ignites after entering the combustion chamber 31a, due to the improved uniformity of the mixture compared to the related art.

Referring to FIG. 4, each fuel peg 100 may be offset from an extension reference line Y that extends from the end of each swirler 20 toward the fuel nozzle base 12 to prevent the fuel injected from the fuel peg 100 from accumulating at an end P of the swirler 20.

If the fuel peg 100 is disposed on the same line as the extension reference line Y of the swirler 20 without being offset therefrom, the fuel injected from the fuel peg 100 accumulates at the end P of the swirler 20, which causes an unnecessary waste of fuel because the accumulated fuel is not used in the combustion chamber 31a, resulting in a deterioration in overall combustion efficiency.

Accordingly, offsetting the fuel peg 100 from the extension reference line Y of the swirler 20 prevents the fuel injected from the fuel peg 100 from accumulating at the end P of the swirler 20.

In addition, the fuel pegs 100 may be arranged in a plurality of stages between the swirlers 20 and the fuel nozzle base 12 on the center body 14.

In FIG. 4, the fuel pegs 100 are arranged in three stages. This is to easily describe the structure and function of the fuel pegs 100 arranged in the plurality of stages. It is understood that the arrangement of the fuel pegs may not be limited to the example illustrated in FIG. 4, and may be changed or vary according to one or more other exemplary embodiments.

For example, the fuel pegs 100 may be classified into a first stage peg 110, a second stage peg 120, and a third stage peg 130.

The first stage peg 110 may be disposed closest to each swirler 20 on the center body 14. In this case, in order to prevent the injected fuel from accumulating at the end P of the swirler 20, the first stage peg 110 may be offset from the extension reference line Y of the swirler 20.

In order for the injected fuel to coincide with the direction of air flow induced by the swirler 20, the first stage peg 110 may have a first injection hole 111 formed at an angle corresponding to an angle of arrangement $\alpha 1$ of the swirler 20. Referring to FIG. 4, because the angle $\alpha 1$ of the first injection hole 111 is equal to the angle of arrangement $\alpha 1$ of the swirler 20, the direction of flow of the fuel injected from the first injection hole 111 coincides with the direction of flow of the air passing through the swirler 20. Therefore, the flow of air and fuel in the arrangement region of the swirler 20 is relatively stable without turbulence.

Based on the combustion chamber 31a, the second stage peg 120 may be disposed behind the first stage peg 110 on the center body 14.

Here, the second stage peg 120 may be offset from the extension reference line Y of the swirler 20 and a first stage peg reference line X1 extending from the end of the first stage peg 110 toward the fuel nozzle base 12.

This is to a) prevent the fuel injected from the second stage peg 120 from unnecessarily accumulating at the end P of the swirler 20 and the body of the first stage peg 110, thereby preventing a deterioration in combustion efficiency, and b) increase the degree of mixing of the air and fuel flowing in the fuel nozzle 18 by offsetting the fuel pegs 100 arranged in the plurality of stages from each other. That is, the region in which air and fuel are mixed is increased because the fuel pegs 100 arranged in the plurality of stages are offset from each other, thereby enabling a mixing action to occur in a wider region in the fuel nozzle 18.

In order to increase the degree of mixing of air and fuel, the second stage peg 120 may include a second front injection hole 121 and a plurality of second rear injection holes 123.

The second front injection hole 121 may be formed in the direction of air flow on the second stage peg 120, and the second rear injection holes 123 may be formed behind the second front injection hole 121 on the second stage peg 120.

In this case, each of the second rear injection holes 123 may be formed at a predetermined angle of injection with the direction of air flow.

That is, fuel is injected from the second front injection hole 121 in the direction of air flow to prevent the injection of the fuel to the end P of the swirler 20 and the first stage peg 110 without disturbing the flow of air.

The second rear injection holes 123 are formed at a predetermined angle of injection with the direction of air flow, in order to increase the degree of mixing of air and fuel while minimizing the disturbance of the flow of air. The fuel injected at the predetermined angle of injection may be mixed with the air flowing in the direction of the combustion chamber 31a while forming some turbulence, thereby improving the mixing rate of air and fuel.

Based on the combustion chamber 31a, the third stage peg 130 may be disposed behind the second stage pegs 120 on the center body 14.

Here, the third stage peg 130 may be offset from the extension reference line Y of the swirler 20, the first stage peg reference line X1 of the first stage peg 110, and a second stage peg reference line X2 extending from the end of the second stage peg 120 toward the fuel nozzle base 12. That is, a third stage peg reference line X3 of the third stage peg 130 may be offset from each of the extension reference line Y of the swirler 20 and the first and second stage peg reference lines X1 and X2.

This is to a) prevent the fuel injected from the third stage peg 130 from unnecessarily accumulating at the end P of the swirler 20 and the bodies of the first and second stage pegs, thereby preventing a deterioration in combustion efficiency, and b) increase the degree of mixing of the air and fuel flowing in the fuel nozzle 18 by offsetting the fuel pegs 100 arranged in the plurality of stages from each other. That is, the region in which air and fuel are mixed is increased because the fuel pegs 100 arranged in the plurality of stages are offset from each other, thereby enabling a mixing action to occur in a wider region in the fuel nozzle 18.

In order to increase the degree of mixing of air and fuel, the third stage peg 130 may include a third front injection hole 131 and a plurality of third rear injection holes 133.

The third front injection hole 131 may be formed in the direction of air flow on the third stage peg 130, and the third rear injection holes 133 may be formed behind the third front injection hole 131 on the third stage peg 130.

In this case, each of the third rear injection holes 133 may be formed at a predetermined angle of injection with the direction of air flow. In the exemplary embodiment, the angle of injection of the third rear injection hole 133 may be greater than that of the second rear injection hole 123. Alternatively, the angle of injection of the third rear injection hole 133 may be perpendicular to the direction of air flow. That is, the angle of injection of the injection hole may be increased as the distance from the swirler 20 increases, in which case the angle of injection increases based on the direction of air flow and the occurrence of turbulence is thus increased during the mixing of air and fuel, thereby improving the degree of mixing thereof.

That is, fuel is injected from the third front injection hole 131 in the direction of air flow to prevent the injection of the fuel to the end P of the swirler 20 and the first and second stage pegs without disturbing the flow of air.

The third rear injection holes 133 are formed at a predetermined angle of injection with the direction of air flow to increase the degree of mixing of air and fuel while minimizing the disturbance of the flow of air. The fuel injected at the predetermined angle of injection may be mixed with the air flowing in the direction of the combustion chamber 31a while forming some turbulence, thereby improving the mixing rate of air and fuel.

In the exemplary embodiment, each fuel peg 100 may have an elliptical shape, when viewed from a top, so as not to disturb the flow of air.

The air flowing along the outer surface of the center body 14 in the fuel nozzle 18 may smoothly flow along the elliptical fuel peg 100 without disturbance of flow relatively.

Hereinafter, a detailed structure of each fuel peg 100 will be described with reference to FIGS. 5 to 8. The fuel peg 100 illustrated in FIGS. 5 to 8 basically has the same structure as the fuel peg 100 illustrated in FIG. 4, but may have a different structure therefrom to include various possible forms.

Referring to FIGS. 5 and 6, the fuel peg 100, having an elliptical shape when viewed from the side, may include a first curved part 151 curved toward the fuel nozzle base 12 and a second curved part 153 curved toward the combustion chamber 31a.

In FIG. 5, a curvature $\phi 1$ of the first curved part 151 may be equal to a curvature $\phi 2$ of the second curved part 153.

Alternatively, as illustrated in FIG. 6, a curvature $\phi 1$ of the first curved part 151 may be smaller than a curvature $\phi 2$ of the second curved part 153. In this case, the first curved part 151 is gentler than the second curved part 153 so that the air flowing along the surface of the center body 14 may smoothly cross over the first curved part 151.

The second curved part 153 may have a front injection hole 154 formed thereon at a predetermined angle with the direction of air flow. The front injection hole 154 may partially correspond to the above-described first injection hole 111 and second and third front injection holes 121 and 131, or otherwise may have a different structure therefrom.

The first curved part 151 may have a rear injection hole 152 formed thereon perpendicular to the direction of air flow. The rear injection hole 152 may partially correspond to the above-described second and third rear injection holes 123 and 133, or otherwise may have a different structure therefrom.

Referring to FIG. 8, a plurality of front injection holes 154 and a plurality of rear injection holes 152 may be disposed on the fuel peg 100. Referring to FIG. 7, the front injection holes 154 and the rear injection holes 152 may be arranged radially at a predetermined interval such that fuel may be injected in various directions therefrom in the fuel nozzle 18.

Referring to FIGS. 5, 6, and 8, at a portion of the outer circumference of each of the front and rear injection holes 154 and 152, a barrier block 170 may be disposed such that fuel is not disturbed by the air flowing over the first and second curved parts 151 and 153 when the fuel is injected from the front and rear injection holes 154 and 152.

The barrier block 170 may be disposed in a form of protruding toward the fuel nozzle base 12 at the outer circumferences of each of the front and rear injection holes 154 and 152.

Because the air flowing over the first and second curved parts 151 and 153 is pushed outward while passing over the barrier blocks 170, the disturbance of fuel injection by the front and rear injection holes 154 and 152 is alleviated.

In order to increase the degree of mixing of fuel and air, a cyclone helix 180 may be formed in either each of the front injection holes 154 or each of the rear injection holes 152 so that fuel is injected while forming turbulence.

The cyclone helix 180 may include a spiral groove 182 and a tapered part 181. The spiral groove 182 may be formed spirally in the front or rear injection hole 154 or 152. The tapered part 181 may be tapered from inside to outside in the front or rear injection hole 154 or 152.

If fuel is injected from the front or rear injection hole 154 or 152 in the fuel peg 100, the fuel rotates spirally along the spiral groove 182 and the tapered part 181 allows the fuel to be injected while gradually increasing in speed according to the law of fluid continuity. Consequently, the fuel is swirled and injected into the fuel nozzle 18.

The degree of mixing of the fuel, discharged while swirling and forming turbulence, with the air in the fuel nozzle 18 is increased, which helps to reduce combustion vibration in the combustion chamber 31a.

Figure 9:
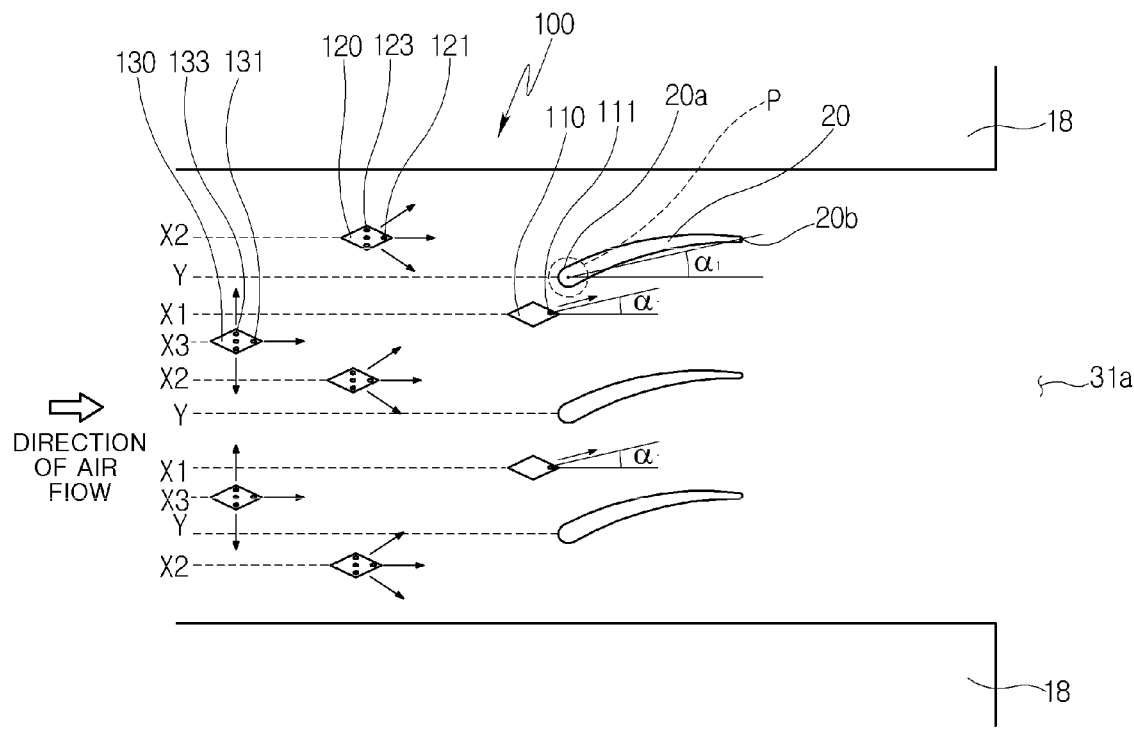
FIG. 9 is a view illustrating an arrangement of swirlers and fuel pegs in the combustor according to another exemplary embodiment.
Figure 10:
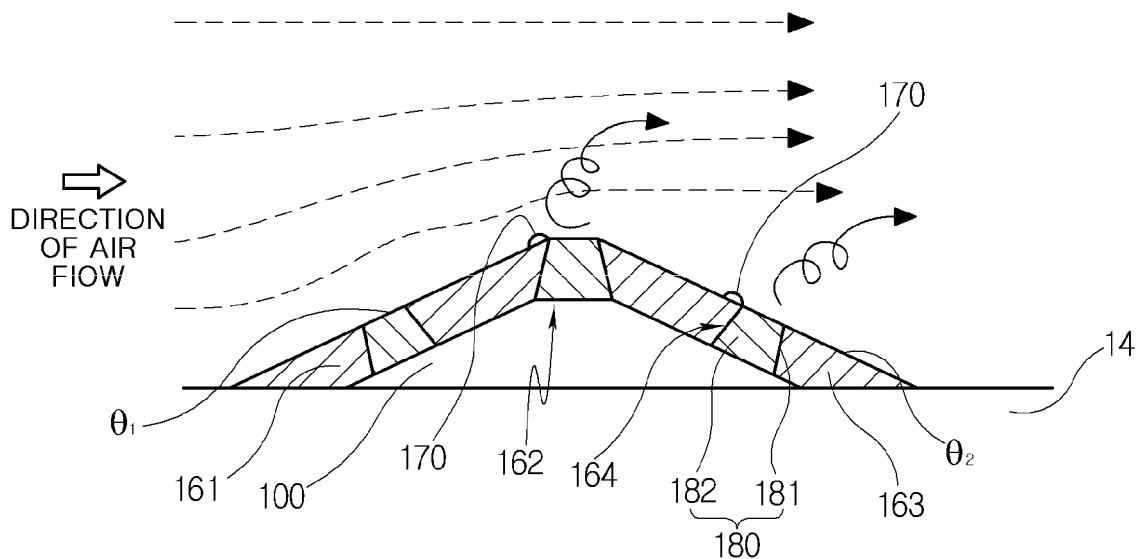
FIG. 10 is a cross-sectional view illustrating one form of fuel peg when viewed from a side according to the another exemplary embodiment.
Figure 11:
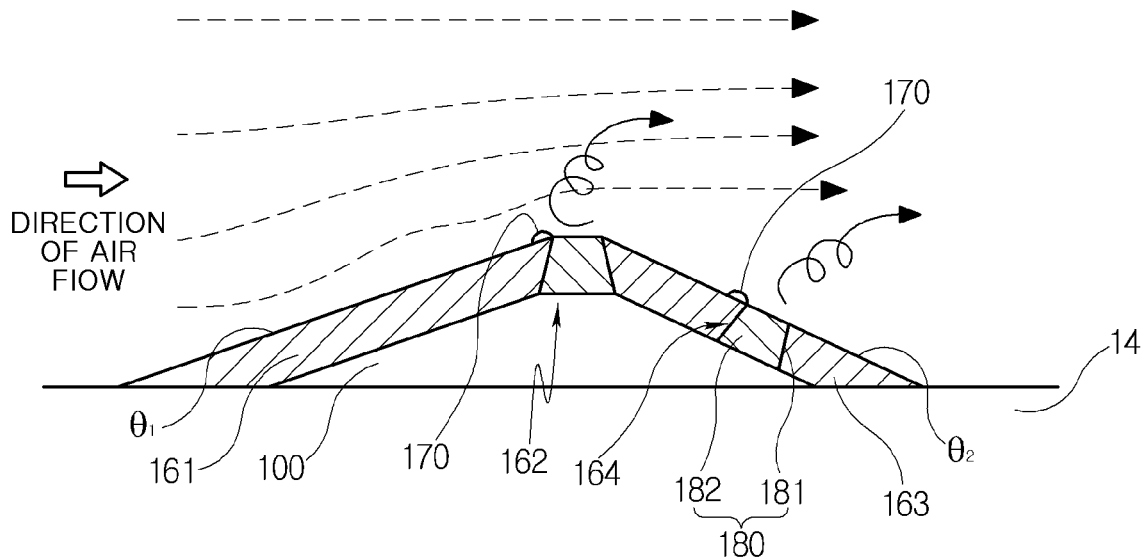
FIG. 11 is a cross-sectional view illustrating another form of fuel peg when viewed from the side according to the another exemplary embodiment.
Figure 12:
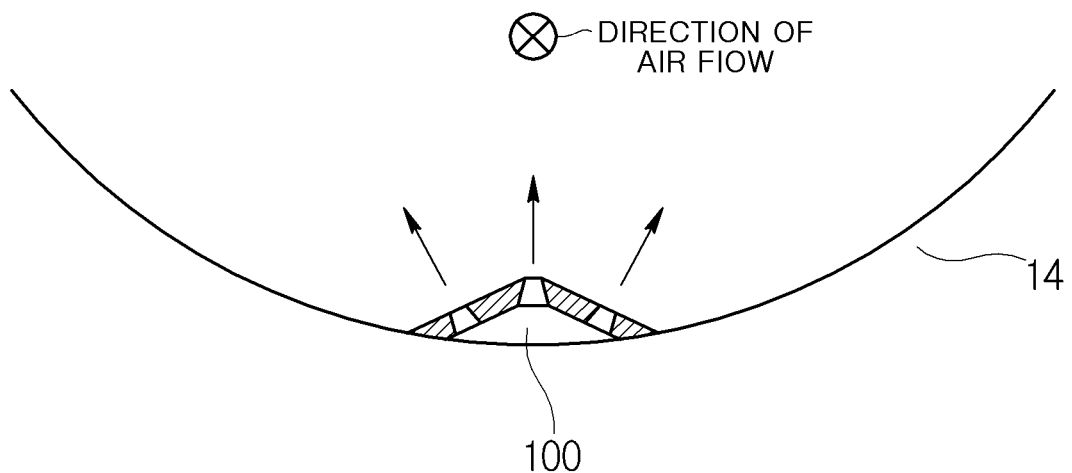
FIG. 12 is a cross-sectional view illustrating one fuel peg when viewed from a rear according to the another exemplary embodiment.
Figure 13:
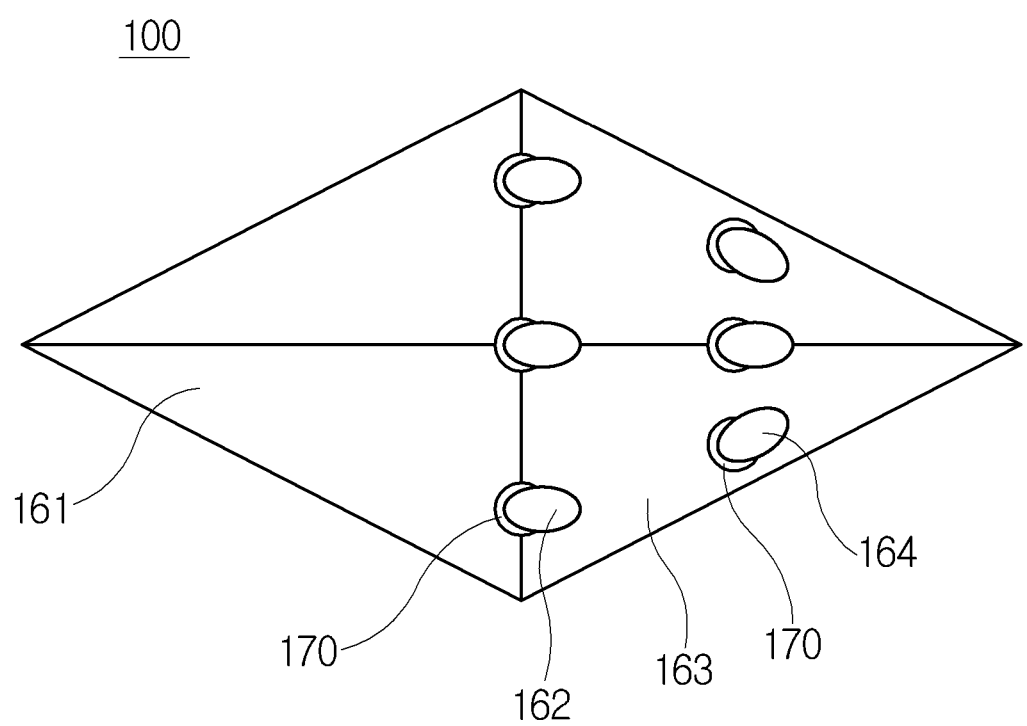
FIG. 13 is a view illustrating one fuel peg when viewed from a top according to the another exemplary embodiment.

FIG. 9 is a view illustrating an arrangement of swirlers 20 and fuel pegs 100 in the combustor according to another exemplary embodiment. FIG. 10 is a cross-sectional view illustrating one form of fuel peg 100 when viewed from a side according to another exemplary embodiment. FIG. 11 is a cross-sectional view illustrating another form of fuel peg 100 when viewed from the side according to another exemplary embodiment. FIG. 12 is a cross-sectional view illustrating one fuel peg 100 when viewed from a rear according to another exemplary embodiment. FIG. 13 is a view illustrating one fuel peg 100 when viewed from a top according to another exemplary embodiment.

Referring to FIGS. 9 to 13, the combustor may include a plurality of fuel nozzles 18, a plurality of center bodies 14, a plurality of swirlers 20, and a plurality of fuel pegs 100. Because the fuel nozzles 18, center bodies 14, swirlers 20, and fuel pegs 100 are basically the same as those of the exemplary embodiment of FIGS. 4 to 8, a description thereof will be omitted below.

In the exemplary embodiment of FIGS. 9 to 13, each fuel peg 100 may have a diamond shape, when viewed from the top, so as not to disturb the flow of air.

The air flowing along the outer surface of the center body 14 in the fuel nozzle 18 may smoothly flow along the inclined surface of the diamond-shaped fuel peg 100 without disturbance of flow relatively.

The fuel peg 100 illustrated in FIGS. 10 to 13 basically has the same structure as the fuel peg 100 illustrated in FIG. 9, but may have a different structure therefrom to include various possible forms.

Referring to FIGS. 10 and 11, the fuel peg 100, having a diamond shape when viewed from the side, may include a first inclined part 161 inclined toward the fuel nozzle base 12 and a second inclined part 163 inclined toward the combustion chamber 31a.

In FIG. 10, an inclination θ1 of the first inclined part 161 may be equal to an inclination θ2 of the second inclined part 163.

Alternatively, as illustrated in FIG. 11, an inclination θ1 of the first inclined part 161 may be smaller than an inclination θ2 of the second inclined part 163. In this case, the first inclined part 161 is gentler than the second inclined part 163 so that the air flowing along the surface of the center body 14 may smoothly cross over the first inclined part 161.

The second inclined part 163 may have a front injection hole 164 formed thereon at a predetermined angle with the direction of air flow. The front injection hole 164 may partially correspond to the above-described first injection hole 111 and second and third front injection holes 121 and 131, or otherwise may have a different structure therefrom.

The first inclined part 161 may have a rear injection hole 162 formed thereon perpendicular to the direction of air flow. The rear injection hole 162 may partially correspond to the above-described second and third rear injection holes 123 and 133, or otherwise may have a different structure therefrom.

Referring to FIG. 13, a plurality of front injection holes 164 and a plurality of rear injection holes 162 may be disposed on the fuel peg 100. Referring to FIG. 12, the front injection holes 164 and the rear injection holes 162 may be arranged radially at a predetermined interval such that fuel may be injected in various directions therefrom in the fuel nozzle 18.

Referring to FIGS. 10, 11, and 13, at a portion of the outer circumference of each of the front and rear injection holes 164 and 162, a barrier block 170 may be disposed such that fuel is not disturbed by the air flowing over the first and second inclined parts 161 and 163 when the fuel is injected from the front and rear injection holes 164 and 162.

The barrier block 170 may be disposed in a form of protruding toward the fuel nozzle base 12 at the outer circumferences of each of the front and rear injection holes 164 and 162.

Because the air flowing over the first and second inclined parts 161 and 163 is pushed outward while passing over the barrier blocks 170, the disturbance of fuel injection by the front and rear injection holes 164 and 162 is alleviated.

In order to increase the degree of mixing of fuel and air, a cyclone helix 180 may be formed in either each of the front injection holes 164 or each of the rear injection holes 162 so that fuel is injected while forming turbulence.

The cyclone helix 180 may include a spiral groove 182 and a tapered part 181. The spiral groove 182 may be formed spirally in the front or rear injection hole 164 or 162. The tapered part 181 may be tapered from inside to outside in the front or rear injection hole 164 or 162.

If fuel is injected from the front or rear injection hole 164 or 162 in the fuel peg 100, the fuel rotates spirally along the spiral groove 182 and the tapered part 181 allows the fuel to be injected while gradually increasing in speed according to the law of fluid continuity. Consequently, the fuel is swirled and injected into the fuel nozzle 18.

The degree of mixing of the fuel, discharged while swirling and forming turbulence, with the air in the fuel nozzle 18 is increased, which helps to reduce combustion vibration in the combustion chamber 31a.

As described above, in accordance with the exemplary embodiments, it is possible to improve the degree of mixing of fuel and air and achieve the reduction in combustion vibration by arranging the fuel pegs for injection of fuel in front of the swirlers based on the direction of air flow.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A combustor comprising:
a fuel nozzle disposed on a nozzle tube;
a center body disposed at a center of the fuel nozzle and connected to a fuel nozzle base;
a plurality of swirlers circumferentially spaced apart from each other between the center body and the fuel nozzle; and
a plurality of fuel pegs spaced apart from each other around the center body to inject fuel into air flowing in the fuel nozzle,
wherein the plurality of fuel pegs are disposed behind the swirlers on the center body based on a combustion chamber of the combustor,
wherein each of the plurality of fuel pegs and each of the plurality of swirlers are arranged to be offset from each other,
wherein individual reference lines extending from the fuel pegs toward the fuel nozzle base are offset from an extension reference line extending from an end of each of the swirlers toward the fuel nozzle base,
wherein the fuel pegs are arranged in a plurality of stages between the swirlers and the fuel nozzle base on the center body, and
wherein when the fuel pegs are arranged in the plurality of stages, a first stage peg which is a fuel peg disposed closest to each of the swirlers includes a first injection hole formed at an angle corresponding to an angle of arrangement (al) of the swirler, and a first stage peg reference line which is the individual reference line extending from an end of the first stage peg toward the fuel nozzle base is offset from the extension reference line of the swirler on the center body.

2. The combustor according to claim 1, wherein a second stage peg reference line which is the individual reference line extending from an end of a second stage peg which is a fuel peg disposed behind the first stage peg based on the combustion chamber toward the fuel nozzle base is offset from the extension reference line of the swirler and the first stage peg reference line on the center body.

3. The combustor according to claim 2, wherein the second stage peg comprises:
a second front injection hole formed in a direction of air flow; and
a plurality of second rear injection holes disposed behind the second front injection hole, each of the second rear injection holes being formed at a predetermined angle of injection with the direction of air flow.

4. The combustor according to claim 3, wherein a third stage peg reference line which is the individual reference line extending from an end of a third stage peg which is a fuel peg disposed behind the second stage peg based on the combustion chamber toward the fuel nozzle base is offset from the extension reference line of the swirler and the first and second stage peg reference lines on the center body.

5. The combustor according to claim 4, wherein the third stage peg comprises:
a third front injection hole formed in the direction of air flow; and
a plurality of third rear injection holes disposed behind the third front injection hole, each of the third rear injection holes being formed at a predetermined angle of injection with the direction of air flow and having an angle of injection greater than the second rear injection hole.

6. The combustor according to claim 1, wherein each of the fuel pegs has an elliptical shape such that the air flows smoothly thereon.

7. The combustor according to claim 6, wherein each of the fuel pegs comprises a first curved part curved toward the fuel nozzle base and a second curved part curved toward the combustion chamber, and the first curved part has a relatively gentler curvature than the second curved part.

8. The combustor according to claim 7, wherein each of the fuel pegs further comprises a front injection hole formed at a predetermined angle of injection with a direction of air flow, the front injection hole being disposed on the second curved part.

9. The combustor according to claim 8, wherein each of the fuel pegs further comprises a rear injection hole formed perpendicular to the direction of air flow, the rear injection hole being disposed on the first curved part.

10. The combustor according to claim 9, wherein a barrier block is disposed, in a form of protruding toward the fuel nozzle base, at a circumference of the front or rear injection hole.

11. The combustor according to claim 9, wherein
a cyclone helix is formed in the front or rear injection hole so that the fuel is injected while forming turbulence to increase a degree of mixing of the fuel and the air, and
the cyclone helix comprises a spiral groove formed spirally in the front or rear injection hole and a tapered part tapered from inside to outside in the front or rear injection hole.

12. The combustor according to claim 1, wherein each of the fuel pegs has a diamond shape such that the air flows smoothly thereon.

13. The combustor according to claim 12, wherein
each of the fuel pegs comprises a first inclined part inclined toward the fuel nozzle base and a second inclined part inclined toward the combustion chamber, and
the first inclined part has a relatively gentler inclination than the second inclined part.

14. The combustor according to claim 13, wherein each of the fuel pegs further comprises:
a front injection hole formed at a predetermined angle of injection with a direction of air flow, the front injection hole being disposed on the second inclined part; and
a rear injection hole formed perpendicular to the direction of air flow, the rear injection hole being disposed on the first inclined part.

15. The combustor according to claim 14, wherein a barrier block is disposed, in a form of protruding toward the fuel nozzle base, at a perimeter of the front or rear injection hole.

16. The combustor according to claim 14, wherein
a cyclone helix is formed in the front or rear injection hole so that the fuel is injected while forming turbulence to increase a degree of mixing of the fuel and the air, and
the cyclone helix comprises a spiral groove formed spirally in the front or rear injection hole and a tapered part tapered from inside to outside in the front or rear injection hole.

17. A gas turbine comprising:
a casing;
a compressor section disposed in the casing and configured to produce compressed air;

a combustor being connected to the compressor section in the casing and configured to combust a mixture of fuel with the compressed air, the combustor comprising:
a fuel nozzle disposed on a nozzle tube;
a center body disposed at a center of the fuel nozzle and connected to a fuel nozzle base;
a plurality of swirlers circumferentially spaced apart from each other between the center body and the fuel nozzle; and
a plurality of fuel pegs spaced apart from each other around the center body to inject the fuel into the compressed air flowing in the fuel nozzle,
wherein the plurality of fuel pegs are disposed behind the swirlers on the center body based on a combustion chamber of the combustor,
wherein each of the plurality of fuel pegs and each of the plurality of swirlers are arranged to be offset from each other,
wherein individual reference lines extending from the fuel pegs toward the fuel nozzle base are offset from an extension reference line extending from an end of each of the swirlers toward the fuel nozzle base,
wherein the fuel pegs are arranged in a plurality of stages between the swirlers and the fuel nozzle base on the center body, and
wherein when the fuel pegs are arranged in the plurality of stages, a first stage peg which is a fuel peg disposed closest to each of the swirlers includes a first injection hole formed at an angle corresponding to an angle of arrangement (al) of the swirler, and a first stage peg reference line which is the individual reference line extending from an end of the first stage peg toward the fuel nozzle base is offset from the extension reference line of the swirler on the center body,
a turbine section connected to the combustor in the casing and configured to generate power using combustion gas generated by the combustor; and
a diffuser connected to the turbine section in the casing and configured to discharge the combustion gas to an outside.

\* \* \* \* \*